United States Patent [19]
Yacobi

[11] Patent Number: 5,878,138
[45] Date of Patent: *Mar. 2, 1999

[54] SYSTEM AND METHOD FOR DETECTING FRAUDULENT EXPENDITURE OF ELECTRONIC ASSETS

[75] Inventor: Yacov Yacobi, Mercer Island, Wash.

[73] Assignee: Microsoft Corporation, Redmond, Wash.

[*] Notice: The term of this patent shall not extend beyond the expiration date of Pat. No. 5,872,844.

[21] Appl. No.: 600,409

[22] Filed: Feb. 12, 1996

[51] Int. Cl.$^6$ ............... H04K 1/00; H04L 9/00; G06F 7/04; G07D 7/00
[52] U.S. Cl. ................ 380/24; 380/23; 380/25; 705/41; 705/44; 340/825.3; 340/825.33; 340/825.34; 340/825.35
[58] Field of Search .................. 380/23, 24, 25; 705/41, 44; 340/825.3, 825.33, 825.34, 825.35

[56] References Cited

U.S. PATENT DOCUMENTS

| | | | |
|---|---|---|---|
| 4,914,698 | 4/1990 | Chaum | 380/30 |
| 4,977,595 | 12/1990 | Ohta et al. | 380/24 |
| 4,987,593 | 1/1991 | Chaum | 380/3 |
| 5,224,162 | 6/1993 | Okamoto et al. | 380/24 |
| 5,453,601 | 9/1995 | Rosen | 235/379 |
| 5,455,407 | 10/1995 | Rosen | 235/380 |
| 5,511,121 | 4/1996 | Yacobi | 380/24 |
| 5,623,547 | 4/1997 | Jones | 380/24 |

*Primary Examiner*—Gail O. Hayes
*Assistant Examiner*—Hrayr A. Sayadian
*Attorney, Agent, or Firm*—Lee & Hayes, PLLC

[57] ABSTRACT

An electronic asset system includes tamper-resistant electronic wallets that store non-transferable electronic assets. To break such tamper-resistant wallets, the criminal is expected to spend an initial investment to defeat the tamper-resistant protection. The electronic assets are uniquely issued by an institution to a wallet (anonymously or non-anonymously). During expenditure, the electronic assets are transferred from the wallet to a recipient. Since the assets are non-transferable, they are marked as exhausted assets upon expenditure. The recipient then batch deposits the received electronic assets with a collecting institution (which may or may not be the same as the issuing institution). A fraud detection system samples a subset of the exhausted assets received by the recipient to detect "bad" assets which have been used in a fraudulent manner. Upon detection, the fraud detection system identifies the electronic wallet that used the bad asset and marks it as a "bad wallet". The fraud detection system then compiles a list of bad electronic wallets and distributes the list to warn potential recipients of the bad electronic wallets. When a bad wallet next attempts to spend assets (whether fraudulently or not), the intended recipient will check the local hot list of bad wallets and refuse to transact business with the bad wallet.

44 Claims, 4 Drawing Sheets

SYSTEM AND METHOD FOR DETECTING FRAUDULENT EXPENDITURE OF ELECTRONIC ASSETS

TECHNICAL FIELD

This invention relates to systems which exchange electronic assets as representations of value. More particularly, the invention relates to systems and methods for detecting fraudulent use of electronic assets.

BACKGROUND OF THE INVENTION

Electronic assets are digital representations of value. Electronic assets might be used to represent cash, coins, tokens, entertainment tickets, government entitlement provisions, and so one.

One attribute of electronic assets is transferability. Transferable electronic assets are similar to paper dollars in that the same assets can be exchanged, traded, and reused numerous times. Non-transferable electronic assets are used only once, and then retired from circulation after this single use; they are not reused numerous times. This invention is particularly directed to non-transferable electronic assets.

Electronic assets are long, mostly random binary strings, with some relatively small recognizable pattern that are signed by the issuer. For instance, an electronic asset might consist of 500 bits in which the left most 400 bits are truly random, the right most 50 bits are an identifiable string (e.g., all binary zeroes), and the intervening 50 bits are an expiration date. The binary strings are typically generated by an institution that issues the electronic assets. Banks, ticket companies, federal or local government, and businesses are all possible issuers of different kinds of electronic assets.

Once issued, the electronic assets are carried in an electronic storage facility, often referred to as an "electronic wallet." Electronic wallets are tamper-resistant storage devices which make it difficult to commit fraud. The size of the electronic wallet depends upon the kind and amount of assets to be stored thereon. As an example, an electronic wallet uses approximately 10 kilobytes of memory to store $100 in units of $1 digital coins.

Driven by technological advances, there is an increasing desire to conduct more commerce electronically, thereby replacing traditional asset forms (bills, coins, ticket paper, etc.) with electronic assets that represent them. A major segment of commerce is found at the low end of the value scale. This commerce involves values equivalent to present day cash, such as paper bills (i.e., $1, $5, $10, $20, $50, and $100 bills) and coins (i.e., nickels, dimes, quarters, half-dollars, and dollars). It is this low end of the market where online systems are simply too expensive or too slow. Users are also more likely to desire anonymity since they may dislike or distrust a system where every purchase, down to vending machines and toll bridges, is monitored and traced. Additionally, this low value end is where fraud is likely to germinate because there is less incentive to detect fraud due to the small value involved. In contrast, transactions involving electronic assets at the higher end of the value scale are more closely scrutinized by both parties and are often guided by rigid protocols involving signatures and confirmation of available funds for the transactions. Also, in the higher end of the market, where credit and checks are used, the danger of forging money does not exist. Although there remains a danger of users cheating each other, there is no danger of cheating the banking system, the Federal Reserve, and so on. This danger, however, exists with cash-like systems.

One main problem with electronic assets is that they can be easily duplicated. Unlike paper dollars or coins, a string of bits that constitutes the electronic assets can be easily and rapidly replicated using computers. This presents a significant risk of fraud. Criminals can reproduce the bit string of an asset and pass off the forged or counterfeited electronic assets as real. To the recipient, the counterfeit bit string offered by the criminal is identical to the expected asset bit string, rendering it difficult to detect whether the offered bit string is the original asset or a reproduced asset that has been used many times before. If successful, the criminals have the opportunity to multi-spend the same asset many times. This type of digital fraud is known as "double spending."

One proposed solution to this problem is to devise a system that prohibits double spending. This solution is centered on use of a tamper-"proof" electronic wallet which, by its design, makes it nearly impossible to modify or clone the wallet to perform fraudulent transactions. Unfortunately, such designs are never truly tamper-"proof," rather just tamper-"resistant." In other words, if criminals were willing to invest the necessary capital, albeit large, they could reverse engineer the electronic wallet to perform fraudulent tasks. The cost of breaking tamper-resistant devices varies dramatically with the technology and the evolution of technology over time.

Another proposed solution to double spending is to develop an online banking system to discover assets which have been double spent. In this system, each electronic asset that is spent is collected by a central bank or other institution and evaluated for possible double expenditure. Since the asset is non-transferable and can be spent only once, the discovery of identical assets reveals that the asset has been double spent. When a recipient receives a new asset, it uses the on-line banking network to determine whether that same asset has been previously spent. The primary drawbacks of the online approach are the tremendous expense involved in managing an online system and the potentially long delay periods experienced when a recipient is attempting to verify a new asset. Another drawback is that not all recipients are online with the bank. For instance, the assets might be used in off-line devices, such as vending machines or toll booths. Attempting to network all possible recipient machines would be extremely expensive.

A variation of the online bank system is for the bank to offer "after the fact" exposure of double spenders, which is particularly used in anonymous electronic asset systems. In this scenario, the bank evaluates each spent asset for possible double spending. As long as the user follows the stipulated guidelines and spends each asset only once, the user remains anonymous. However, if the user multi-spend the same asset, the bank detects the fraud and has enough information to identify the criminal user. Those culprits are then sought out and prosecuted.

Like the online system, however, this "after the fact" system has drawbacks in the enormous size and expense required to store and track every asset. Moreover, due to the shear volume of assets being evaluated, detection and enforcement might be delayed long enough for the criminal to make an illegitimate profit and then slip away before being apprehended.

Accordingly, there is a need to design a system which facilitates use of electronic assets, even in the low value commerce segment, while detecting and preventing fraud. Such a system should also satisfy countervailing goals of being efficient, reliable, and cost effective.

SUMMARY OF THE INVENTION

This invention concerns an electronic asset architecture which replaces or subsidizes expensive and inefficient deterministic fraud detection with probabilistic fraud detection. This architecture attempts to detect fraud and eliminate further fraud before the criminal has had an opportunity to profit illegitimately.

According to one aspect of this invention, an electronic asset system includes tamper-resistant electronic wallets which store non-transferable electronic assets. The tamper-resistant wallets are implemented as small portable computing devices with their own trusted displays and keyboards, such as hand held computers, personal digital assistants, or laptop computers. The tamper-resistant technology make it difficult to directly open the wallet's memory to obtain the stored assets, or to communicate with the wallet other than as specified by certain cryptographic protocol, which also protects the communication channel. To break such tamper-resistant wallets, the criminal is anticipated to make an initial investment to defeat the tamper-resistant protection.

The electronic assets stored on the wallets can be in the form of cash, tokens, government entitlements, or the like. The assets are uniquely issued by an institution and assigned to a particular wallet. During expenditure, the electronic assets are transferred from the wallets to a recipient, which is usually a merchant or a vendor, but not always; other user wallets can also receive the transferred assets. Since the assets are non-transferable, they are marked as exhausted assets upon expenditure. The recipient batch deposits once a day the received electronic assets with a bank or other collecting institution (which may or may not be the same as the issuing institution).

The electronic asset system further includes a fraud detection system which samples a subset of the exhausted assets received by the recipient and deposited in the bank. For instance, the fraud detection system might sample one in every 10,000 exhausted assets. The sampled assets are sent to the fraud detection system immediately, rather than batched at the end of a day. The fraud detection system uses the sample to detect "bad" assets which have been used in a fraudulent manner. Detection is performed by comparing the exhausted assets in the sampled subset to determine whether there is a match. A match of two or more assets indicates that those assets have been double spent.

Upon detection, the fraud detection system identifies the electronic wallets that used the bad assets and marks the wallets as "bad". The fraud detection system then compiles a list of bad electronic wallets and posts the list to warn potential recipients that the bad electronic wallets have been previously used in a fraudulent manner. The list (which is also referred to as a "hot list" or "revocation is list") can be initially broadcast in its entirety to recipients and the electronic wallets themselves over a data communication network, such as a public network (e.g., the Internet) or a wireless network (e.g., cellular phone and paging network). The hot list of bad wallets is relatively short since it only contains identities of bad wallets (and not individual bad coins) and the wallet certificates have comparatively short expiration terms, and hence can be stored locally on each wallet. Thereafter, the fraud detection system can simply update these distributed lists by broadcasting only the identities of those bad wallets which are to be added to the list. The entire list can also be posted to a central location (e.g., an Internet web site) so that anybody can access and download it. When a bad wallet on the list next attempts to spend assets (whether fraudulently or not), the intended recipient will refuse to transact business with the bad wallet. The architecture that enables creation short hot lists for localized storage is generally applicable to all public key cryptosystems.

According to this probabilistic fraud detection scheme, the criminal might successfully double spend electronic assets during initial transactions. But, due to early detection through sampling, the criminal is eventually prevented from further fraudulent use of the bad wallet. The fraud detection occurs with high probability before the criminal can break even on the initial investment required to clone the wallet in the first place and make an illegitimate profit. Once fraud is detected, further perpetuation is prevented.

DETAILED DESCRIPTION OF THE PREFERRED EMBODIMENT

The following discussion assumes that the reader is familiar with electronic assets (or "electronic tokens" or "digital cash") and cryptography. For a basic introduction of digital cash and cryptography, the reader is directed to a text written by Bruce Schneier and entitled "Applied Cryptography: Protocols, Algorithms, and Source Code in C," published by John Wiley & Sons with copyright 1994, which is hereby incorporated by reference.

Figure 1:
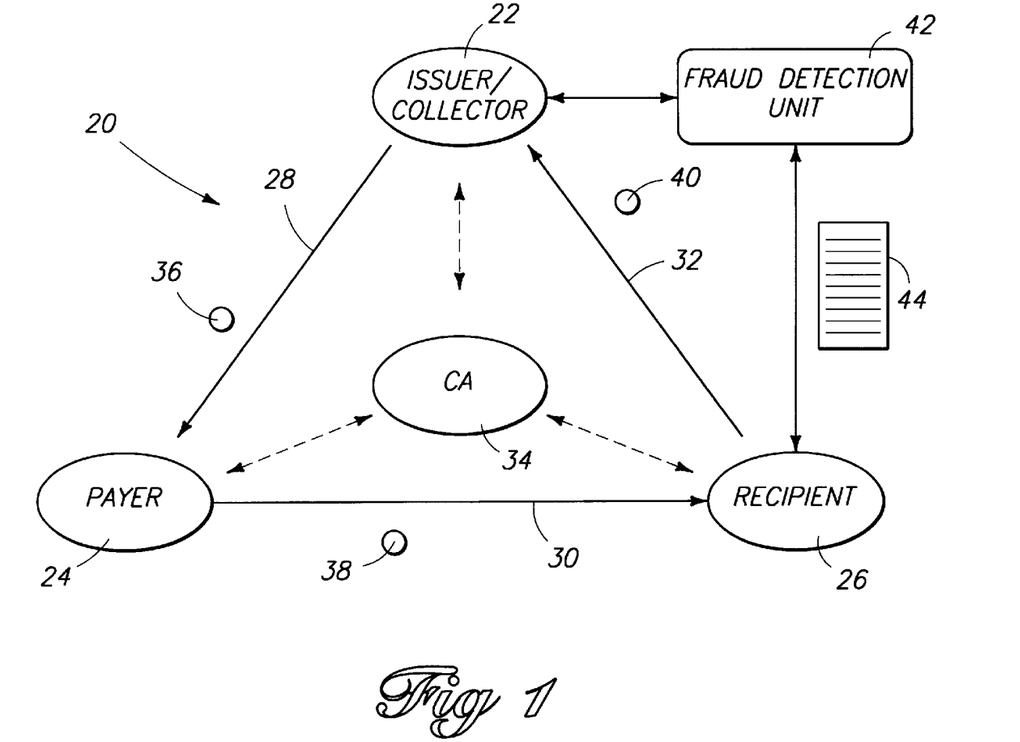
FIG. 1 is a general diagrammatic illustration of an electronic asset system.

FIG. 1 generally shows an electronic asset system 20. As used in this disclosure, the term "electronic asset" means an electronic representation of value, typically expressed in binary bits, and might include tickets, tokens, cash, coins, government entitlements, or the like. A "non-transferable electronic assets" is an electronic asset that is uniquely issued for a single use and are then retired from circulation after the one use. Unlike traditional cash, non-transferable electronic assets are not reused numerous times.

The electronic asset system 20 includes an issuer 22, a payer 24, and a recipient 26. In this most basic model, the issuer 22 additionally functions as the collecting entity, although they can be two separate entities. Assets flow in a loop around the triangle as shown by the uni-directional arrows from issuer/collector 22 to payer 24, to recipient 26, and back to issuer/collector 22. All three entities are tamper-resistant. Communication channels 28, 30, and 32 facilitate communication among the three entities. The channels are representative of many different types of connections, including direct local connections or remote connections over a communication network, such as a public network (e.g., the Internet, telephone, cable TV, etc.) or a wireless network (e.g., cellular phone, paging network, satellite, etc.). These channels are secured using cryptography protocol. More specifically, the communication between participants can be accomplished using secure channel protocols as well as secure messaging protocols.

All entities initially register with a certifying authority 34. In some environments, the issuer 22 and the certifying authority 34 are the same entity. Alternatively, the registering function is performed by a separate entity, which is a trusted third party to both the issuer and the payer. The certifying authority 34 issues certificates that are later used by the parties in a transaction to verify the identity of each other. The role of certifying authority 34 is limited to the registration process and has no part of the payment transaction after this initial registration process.

The initial issuance of electronic assets, represented by coin 36, occurs at the issuer-payer leg of the asset system 20. The issuer 22 issues non-transferable assets 36 to the payer 24. The non-transferable assets are digitally signed by the issuer and may be dedicated to a particular user. The electronic assets is also be issued with an expiration date which, upon elapse, renders the assets unusable in their present form.

The payer 24 stores the electronic assets 36 on an electronic wallet for later use. The electronic wallet is preferably a tamper-resistant device that is small and portable. The electronic wallet has memory to store the assets and cryptographic capabilities to store and manage public/private signing/encryption keys and certificates. The electronic wallet can be implemented as a portable device with its own trusted display and keyboard, such as a hand held computer, a personal digital assistant, or a laptop computer. Rudimentary versions of the electronic wallet might also be implemented as a smart card, a PC card (formerly known as a PCMCIA card), or other IC card.

The issuer-payer leg of the asset system represents many different forms of transactions. For example, the issuer 22 might be a bank and the payer 24 might be an account holder who is withdrawing assets from his/her account. A bank withdrawal transaction can be conducted over an online network connection 28, such as over a private banking network connection (e.g., ATM—automatic teller machine), or over a public network connection (e.g., the Internet) using commercial banking programs like Money from Microsoft Corporation. In another example, the issuer 22 might be a public transit authority, and the payer 24 might be a citizen who purchases tokens to ride on the public transportation system. In this case, the issuer-payer connection 28 might be established at an off-line point-of-sale vending machine that issues tokens to the user's electronic transit card.

The payment or payer-recipient leg of the asset system 20 involves expenditure or use of the assets. Here, the payer 24 spends or uses the assets, represented by coin 38, in some manner by transferring the assets to the recipient 26. Electronically, the transaction involves downloading the electronic assets from the payer's electronic wallet to a computing unit of the recipient. The payer 24 digitally signs the assets 38 before spending them. The recipient 26 verifies the signatures of the issuer 22 and the payee 24 to ensure that they are valid (i.e., not expired or revoked), and that the assets themselves have not expired. If all is acceptable, the recipient 26 accepts the assets as a valid payment and the assets are forever removed from the payer's wallet.

The payer-recipient leg of the asset system 20 is likewise representative of many different forms of transactions. For example, the payer 24 might be a consumer and the recipient 26 might be a merchant, with the purchase occurring over a public network connection 30. In another example, the payer 24 might be a thirsty individual and the recipient 26 might be a beverage vending machine, with the communication link 30 being an off-line direct connection at the vending machine.

The deposit or recipient-collector leg of the asset system 20 concerns recovery of the non-transferable assets. Because the assets are non-transferable and used only once, the assets are retired and deemed exhausted upon their use. In this final leg, the recipient 26 deposits the assets, represented by coin 40, with the collector 22. The collector 22 may or may not be the same entity as the issuer, but is shown as the same for discussion purposes. The collector 22 stores all of the incoming electronic assets and archives them until expiration. The recipient-collector leg is representative of a merchant (recipient 26) depositing receipts with a bank (collector 22) using a secure channel 32. Another example might be a token machine (recipient 26) returning collected tokens to the public transit authority (collector 22), wherein the connection 32 is a secure transfer medium such a portable memory device with the deposited assets encrypted thereon.

The electronic asset system 20 also has a fraud detection unit 42 to evaluate a sampled subset of the electronic assets received by the recipient 26 to detect if any electronic assets have been used in a fraudulent manner. The recipient forwards samples of the exhausted assets to the fraud detection unit 42 on an ongoing basis. The sampling rate is controlled by the fraud detection unit 42 and varies in time and space to efficiently target suspected fraud patterns. The fraud detection unit compares the sampled assets to determine whether there is a match between two or more electronic assets. Because each asset is presumed unique and used only once, a match indicates that the same electronic asset has been double spent.

If fraudulent use is detected, the fraud detection unit 42 marks the electronic asset as "bad." Thereafter, the fraud detection unit 42 identifies the electronic wallet that spent the bad electronic asset. This identification is made examining the signature of the wallet that is attached to the exhausted asset. The fraud detection unit 42 compiles a list 44 of tainted or bad wallets. The list is initially distributed to the recipient 26 to warn of the bad wallets, and then updated as subsequent bad wallets are identified. If the electronic assets were initially issued to a dedicated payer 24 who can be identified from the asset itself, the fraud detection unit 42 might further identify the payer 24 who spent the electronic asset.

The list 44 of bad wallets can be distributed from the fraud detection unit 42 to the recipient 26 in a number of different ways. The list might be broadcast over a data communications network (i.e., Internet, interactive television, telephone, cable TV, etc.) or a wireless communications network (e.g., cellular, paging, radio, etc.). The list might be posted at a publicly accessible location, such as a web site. Alternatively, the list might be transported or mailed on a storage medium. Updates to the list are preferably broadcast in real time to ensure that the recipient is kept current.

The recipient 26 is now equipped with the list of bad wallets. When a criminal payer 24 subsequently attempts to use a bad wallet found on the list, the recipient 26 will refuse to transact business with the payer. In this manner, the payer 24 is prevented from further promulgating fraud using the bad wallet. Additionally, the list 44 can be stored on each electronic wallet. Because the list of wallets is relatively small (as compared to a list of bad assets) and the wallets have short expiration terms (wallet expiration is synonymous with wallet certification expiration), the list is sufficiently short to store on individual wallets as an accountability measure. This aspect is described below in more detail. Moreover, each wallet can perform routine cleanup processes to remove expired hot listed wallets. The architecture that enables derivation and storage of short hot lists on individual wallets is applicable to all public key cryptosystems and can be employed in other environments outside of electronic asset systems.

Accordingly, the electronic asset system 20 employs an asset-level criteria to uncover fraudulent transactions, while accountability is at the wallet level. With random sampling, the fraud detection unit 42 only evaluates a tiny fraction of the exhausted assets. For example, the fraud detection unit might only examine one out of every 100 exhausted assets. This involves substantially less processing and storage resources in comparison to an online system which examines the entire set of exhausted assets. As a result, the fraud detection unit requires less bandwidth, is fast and efficient with less sensitivity to delays, and can sound an early warning to prevent subsequent fraud. In the case of an anonymous system (described more fully below), the fraud detection unit eliminates the need for detection processes aimed at "after the fact" exposure of double spenders.

Although the fraud detection unit 42 cannot detect all fraud, it has a statistically high probability of detecting fraud. For appropriate sampling rates, the detection probability can be 95% or better. This probability is sufficient to prevent fraud because the criminal is highly likely to be detected before there is an opportunity to profit illegitimately from the fraud.

For instance, suppose the payer 24 stores the electronic assets in a tamper-resistant electronic wallet. To successfully clone this electronic wallet, a criminal is expected to invest a rather large sum of money. If the bad wallet is used to spend low valued electronic assets, such as $1 coins or tokens, the criminal would need to successfully use the bad wallet many, many times before breaking even with the initial investment. The fraud detection unit 42, through appropriate sampling rates, is highly likely to uncover the fraudulent use of the bad wallet well before the criminal has used it enough times to break even. Accordingly, the statistical sampling technique is effective at deterring fraud because the criminal is highly unlikely of ever breaking even on the investment.

While an asset-level criteria is used to uncover fraud, the electronic asset system 20 places accountability at the wallet level. Fraud is committed when the wallet is compromised. Accordingly, the hot list of bad wallets is used as a wallet-level criteria to root out bad wallets during their subsequent use. The list of bad wallets is sufficiently small to be given to all recipients 26. For example, assuming that wallets are configured with certificates that last for one year, a list of all bad wallets for the entire United States is anticipated to consume less than one gigabyte of memory. If the life span of the certificate registered to the electronic wallet is reduced to one month, a list of bad wallets is anticipated to consume no more than 10 megabytes. At this latter size, the list can be stored on each individual wallet. These local lists are useful to the recipient because it eliminates a need for online verification of each asset being received. The recipient can simply check whether the wallet is on the hot list of bad wallets before completing a transaction.

The electronic asset system 20 is beneficial at reducing connectivity and online requirements, as well as the transactions costs typically associated with full online verification systems. For small transactions where the asset value is low (e.g., coins, tokens), continuous online connection to a banking or merchant system on a per transaction basis is too expensive. For instance, it is impractical to expect a beverage vending machine to validate each beverage purchase over a network with a localized vending hub computer. Even if the transaction cost was sufficiently low, the real time response delay would be too long and annoying to the consumer, who simply wants a beverage for 75 cents.

With the early warning fraud detection unit, however, only a few samples are required, not every transaction. The samples can be provided over a limited online connectivity (e.g., via the Internet), or in the case of a standalone machine, in a periodic batch effort. Upon compilation of bad wallet lists, the fraud detection unit 42 can transmit updated lists in real time; or for the standalone machine, the list is updated upon routine collection rounds. The volume of online communication is a few orders of magnitude smaller than a full online system and involves reasonably tolerant response delays.

Figure 2:
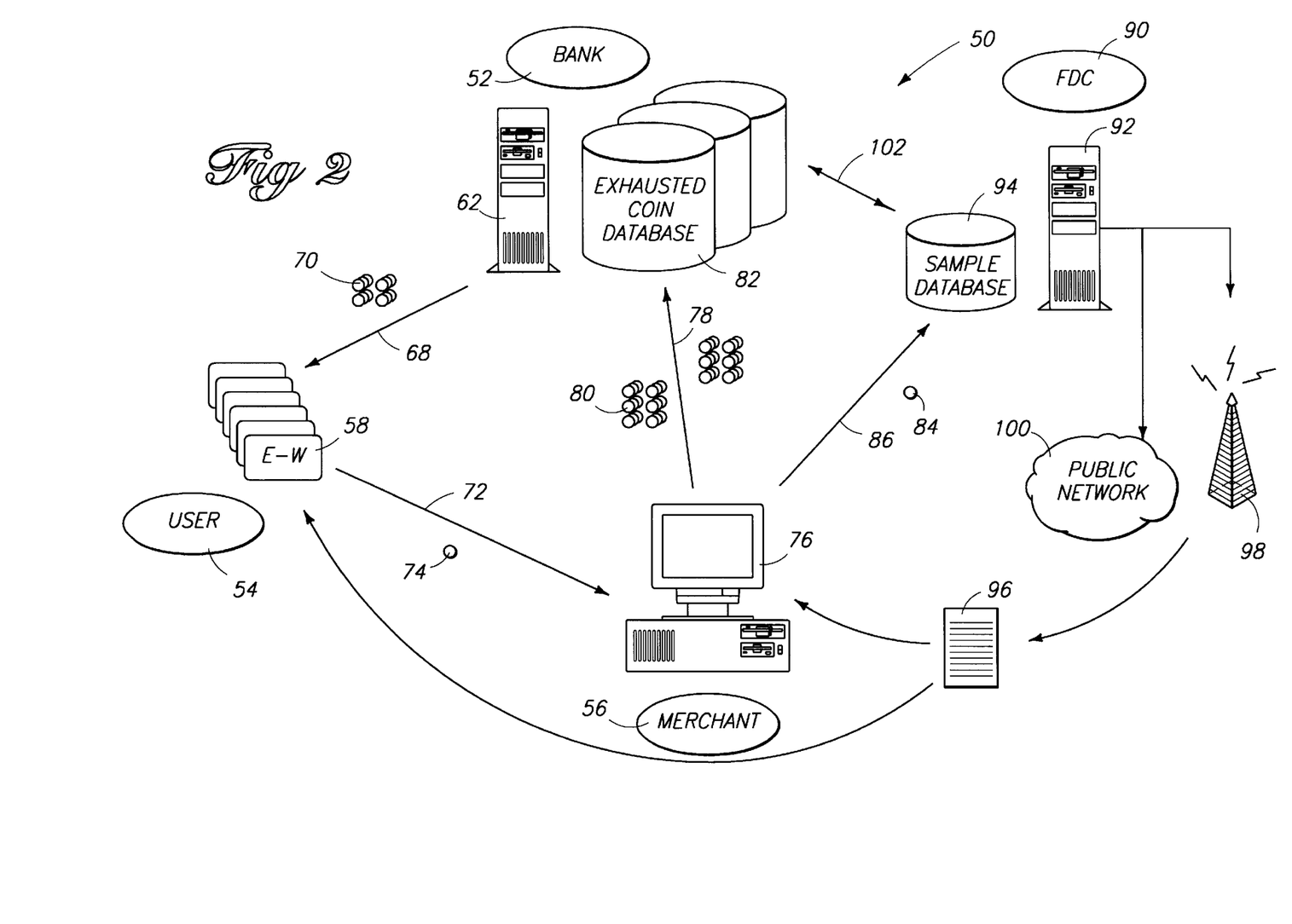
FIG. 2 is a diagrammatic illustration of the electronic asset system in more detail than the general FIG. 1 illustration.

FIG. 2 shows a more detailed example of an electronic asset system with fraud detection that is implemented in the context of a computerized electronic commerce system. The electronic asset system, referenced generally as number 50, includes a bank 52, multiple users 54, and a merchant 56. For purposes of discussion, the bank 52 performs the dual functions of issuing the non-transferable assets and collecting them after utilization. Generally, the electronic asset system 50 can be implemented as a "anonymous" system in which assets are not traceable to the party who received them, or a "non-anonymous" system in which assets are traceable to the certificate of the electronic wallet that spent them.

The non-anonymous implementation is described first, with aspects of the anonymous implementation being described afterwards.

Non-Anonymous Electronic Asset System

To begin the cycle, the user 54 seeks to withdraw electronic assets in the form of electronic cash from the bank 52. In this context, assume that the bank 52 acts as a certifying authority. Initially, the user 54 requires certification of an electronic wallet before the wallet can be used to hold the electronic assets.

The electronic wallet has a processor, a program memory (e.g., ROM or memory drive), volatile data memory (e.g., RAM or Flash), and a non-volatile data memory (EEPROM or memory drive). The electronic wallet can be implemented as a portable device with its own trusted display and keyboard, such as a hand held computer, a personal digital assistant, or a laptop computer. Rudimentary versions of the electronic wallet might also be implemented as a smart card, a PC card (formerly known as a PCMCIA card), or other IC card. The entire electronic wallet, including processors, memory, display, and keyboard are tamper-resistant.

Figure 3:
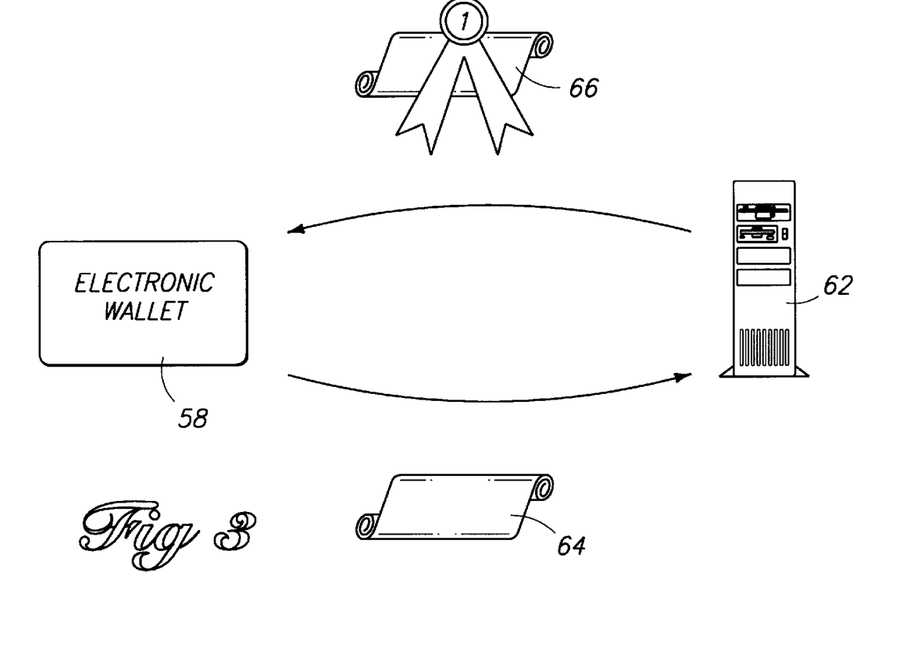
FIG. 3 is a diagrammatic illustration of a certification and withdrawal process in an electronic asset system which is implemented without anonymity.

FIG. 3 shows the certification process in more detail. The electronic wallet 58 is manufactured with initial pairs of public and private keys and a corresponding certificate that is registered with the certifying authority (or the bank, in this example). A certificate is a linkage of a public key and a user identification, which is signed by the certifying authority. (In the anonymous system described below, the user identification is omitted from the certificate.) The initial manufacturer-issued certificate is provided as assurance that the user has a tamper-resistant device. The initial certificate uses a very short expiration term, and the user is expected to re-certify shortly after getting the electronic wallet.

During certification, a user's electronic wallet 58 is connected to the bank's computer 62. This connection can be achieved, for example, using a direct connection, or alternatively over a public network (e.g., the Internet).

The electronic wallet 58 has a cryptographic program stored in the program memory that directs the processor to perform cryptographic functions, such as key generation and management, encryption, decryption, signing, and verification. During certification, the electronic wallet 58 generates a unique pair of public and private cryptographic signing keys, and submits the key pair along with user identification to the bank's computer 62. The initial certificate stored by the manufacturer is also submitted and used to create the secure channel for this first communication. The materials are forwarded in a packet 64.

The bank's computer 62 examines the packet 64 and compares the initial manufacturer-issued certificate to a list of initial certificates to ensure that the wallet is a tamper-resistant device, and to the hot list of bad wallets to ensure that the wallet is not a bad wallet. If the certificate checks out cleanly, the bank's computer confirms the identity of the user. If the user is present, the identification confirmation is performed using traditional methods, such as driver's license, finger prints, and so on. If the user is not present and the certification is handled remotely, the bank relies on other evidence such as a phone number, address, mother's maiden name, and so on. Following successful confirmation, the bank's computer 62 digitally signs the packet to produce a certificate 66. An expiration date is attached to the certificate. The certificate is returned to the electronic wallet 58.

With reference again to FIG. 2, the user initiates the withdrawal transaction by establishing a secure communication channel 68 between the electronic wallet 58 and the bank's computer 62. This is done through an exchange of certificates, whereby the electronic wallet 58 can verify the authenticity of the bank's computer 62 (and software operating thereon) by virtue of the bank's certificate; and conversely, the bank's computer can verify the authenticity of the electronic wallet from the wallet's certificate.

The verification process entails an examination of the digital signature attached to the certificate. For instance, to authenticate the electronic wallet 58, the bank's computer 62 evaluates the digital signature to determine if it is a recognized signature of a trusted certifying authority. In this case, the digital signature on the wallet's certificate happens to be the bank's own signature. The electronic wallet 58 verifies the certificate received from the bank and authenticates the signature on the bank's certificate to ensure that the certificate is from the bank.

Once the initial verification process is completed, the communication between the electronic wallet 58 and the bank's computer 62 is protected using public key cryptography. A symmetric "session" key is generated by the user's electronic wallet 58 and used to encrypt data being transferred to the bank's computer. This session key is then encrypted using a public exchange key of the bank (which was received in the bank's certificate). The user's electronic wallet 58 signs the encrypted message with its own private signing key. The encrypted and signed message, along with the encrypted session key, are sent to the bank. The bank's computer 62 decrypts the session key using its own private exchange key and then decrypts the message using the session key. The bank's computer 62 will further verify the signature using the wallet's public signing key (which was received in the wallet's certificate) to verify that the message did come from the user's electronic wallet and was not subsequently altered. With public key cryptography, the communication is therefore securely exchanged over an otherwise unsecure medium (such as the Internet) by encrypting messages that eavesdroppers are free to intercept, but unable to decrypt into meaningful information. This method of securing communication is known as "secure messaging" in which individual keys are used for each transmission and then destroyed. Another method is to establish a secure channel between the electronic wallet and bank's computer, whereby the same encryption key is used for many messages. Some precautions are taken when reusing the same key, but such precautions are standard and well known in the art.

With the secured channel 68 established, the user 54 requests withdrawal of electronic cash. Suppose the user wants to withdraw $100 in units of $1 coins. The bank's computer has coin issuing software executing thereon which utilizes a random number generator to create a nonce (i.e., a fresh string of data) representative of each non-transferable coin. The bank's computer then attaches a serial number and an expiration date. The entire data string might be 550 bits long, in which 400 bits are random, 50 bits constitute a serial number, 50 bits constitute an expiration date, and 50 bits are a string of zero bits. Using a hashing function, the bank's computer 62 computes a cryptographic digest or "hash" of the data string. A hash function is a mathematical function that converts an input data stream into a fixed-size, often smaller, output data stream that is representative of the input data stream. The bank's computer 62 is programmed to digitally sign the cryptographic digest (hash) by operating with the bank's private signing key for the $1 denomination to create a $1 coin. The bank's computer employs a different pair of signing keys for each denomination. Accordingly, a $1 digital coin is created as follows:

$$S_{K.\$1.sign.pri.bank}(\text{Digest}) = \$1 \text{ Coin}$$

where "$S_{K.\$1.\ sign.pri.bank}$" is a signing function using the bank's private $1 signing key.

The coins 70 are downloaded to the user's electronic wallet 58 over the secure communication channel 68. The bank debits the user's account for the amount of money withdrawn. The coins are stored in the electronic wallet 58. The user is free to carry the electronic wallet and use it wherever he/she wishes.

Suppose the user 54 desires to buy a $1 item or service from merchant 56. The user initiates communication with the merchant and establishes a secure communication channel 72 in the manner described above. Upon purchase, the user's electronic wallet 58 digitally signs a $1 coin with its private signing key, as follows:

$$S_{K.sign.pri.wallet}(\$1 \text{ Coin}) = \text{Proffered } \$1 \text{ Coin}$$

where "$S_{K.sign.pri.wallet}$" is a signing function using the wallet's private signing key.

The signed coin 74 is tendered to the merchant 56. The merchant's computer 76 runs software which evaluates the proffered coin by checking the signatures of both the bank and the electronic wallet. The wallet signature is checked against a local list of bad wallets to ensure that the wallet is not bad. Finally, the coin itself is evaluated to ensure that it has not expired. If the evaluation yields positive affirmation, the merchant's computer 76 accepts the coin 74 in exchange for the purchased item or service.

Periodically, the merchant 56 batch deposits all of the received coins to the bank 52. Typically, the merchant's bank is different than the user's bank but, for discussion purposes, the issuing bank is also the collecting bank. To deposit the received coins, the merchant's computer 76 establishes a secure communication channel 76 with the bank's computer 62. The spent coins 80 are then downloaded over the secure channel 76 to the bank's computer 62.

The spent coins are considered to be exhausted following their single use. The bank stores all of the exhausted coins in a large database 82. To store all of the exhausted coins issued by an individual bank, the exhausted coin database 82 is expected to be at least ten gigabytes, and can be twenty or more gigabytes.

The bank's computer can then, if desired, perform a comprehensive fraud evaluation check to determine if any of the coins in the huge database 82 has been double spent. However, this deterministic "after the fact" process is a large task, requiring substantial processing capabilities. The bank may forego such deterministic evaluation in favor of only performing the statistical evaluation, described below.

The merchant's computer 56 also submits a sample of the received coins, represented by coin 84, over a secure channel 86 to a fraud detection center (FDC) 90. The sample is a small fraction, but statistical representative, of the large number of coins being deposited in the bank.

Figure 4:
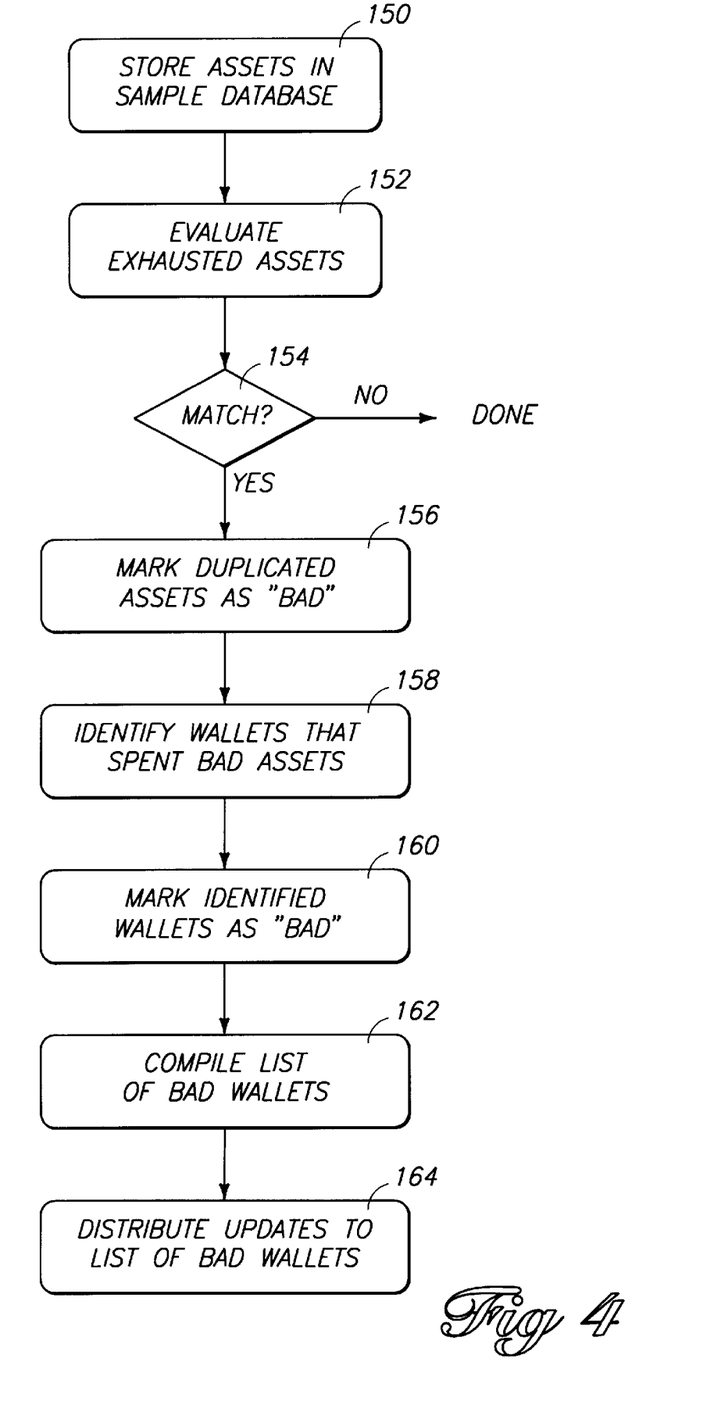
FIG. 4 is a flow diagram of steps in a computer-implemented method for detecting fraudulent transactions according to an aspect of this invention.

The fraud detection center 90 has a computer 92 which is programmed to perform the steps shown in FIG. 4. The computer 92 receives the sampled coins 84 from the merchant computer 76 and stores them in a sample database 94 (step 150 in FIG. 4). The FDC computer 92 is programmed to evaluate the exhausted coins in the sample database 94 to detect if any of them have been used in a fraudulent manner (step 152 in FIG. 4). In particular, a software program executing on the FDC computer 92 performs a comparison analysis in which the exhausted coins are compared to one another to see if any of them match (step 154 in FIG. 4). This comparison can be performed as each newly exhausted asset is received. A match occurs when, after the signatures are stripped away, the random bit portions of two or more coins are identical. If no match is found (i.e., the "no" branch from step 154), the analysis is completed for that cycle. Conversely, if a match is found (i.e., the "yes" branch from step 154), the computer program marks the duplicated coins as "bad" coins (step 156).

The FDC computer 92 then uses the signature attached to the bad coins to identify the certificate issued to the electronic wallet that spent them (step 158 in FIG. 4). The suspect wallet is then labeled as being a "bad" wallet (step 160 in FIG. 4). It is noted that the software running on the FDC computer 92, as well as the software executing on the bank and merchant computers, are loaded from computer-readable memory (e.g., a floppy disk, optical disk, or hard disk) and executed by processing units in the computers.

The coin analysis might reveal multiple bad wallets. Accordingly, the FDC computer 92 compiles a list in an electronically readable data structure that contains all of the bad wallets (step 162 in FIG. 4), or more specifically, all of the certificates of the bad wallets. As the list 96 is updated, the updates are broadcast in real time over a wireless network, as represented by RF tower 98, or a wire-based network, as represented by a public data communication network (i.e., the Internet) 100, to the electronic wallets 58 and to the merchant's computer 76 (step 164). Other types of distribution networks may also be used, such as cable TV or interactive television systems, cellular phone and paging networks, and telephone lines. Additionally, the entire list 96 can also be posted at a publicly accessible location for anybody to access and download, such as an Internet web site. The distributed local hot lists provide the merchant 56 with ready, on-the-spot identification of bad wallets. The list is also sent to the bank 52 via a secure communication channel 102.

With the local hot list of bad wallets, the merchant computer 76 can evaluate all signatures on subsequently tendered coins to determine whether they are from a bad wallet. If so, the merchant computer 76 will refuse the transaction and cease communication with the bad wallet. Additionally, law-enforcement agencies can masquerade as merchants to perform sting operations aimed at ferreting out bad wallets.

The bank 52 may continue to perform deterministic evaluation all coins stored in the exhausted asset database 82 to absolutely detect fraud. In this case, the fraud detection center functions as an early warning system that operates quickly to detect fraud from the small sample and warn others of bad wallets. This early warning detection supplements the banks deterministic evaluation. On the other hand, the bank may decide that the probabilistic evaluation performed by the fraud detection center is satisfactory and eliminate the database 82 altogether.

Each electronic wallet 58, inclusive of the bad wallets, must periodically renew their certification before the expiration date of the certificate. Example expiration terms can be one month to one year. The renewal process is similar to the original certification process explained above with respect of FIG. 3, but further includes the electronic wallet's obligation to submit the old certificate with public and private keys. The certifying authority (or bank in this case), examines the old certificate in view of the hot list of bad wallets. If listed, the bank refuses the transaction, and might even be able to identify the user 54. Conversely, if the old certificate is clean, the bank issues a new certificate for a new expiration term.

A shorter expiration term requires that the electronic wallet be re-certified more regularly. This, in turn, exposes bad wallets more often, before they can promulgate fraud to any large extent. Conversely, too short of term might be administratively bothersome because the user is continuously updating the wallet's certificates. Accordingly, expiration terms are set according to the environment of use, while taking into consideration these competing goals.

The combination of compiling lists of wallet certificates (and not coins) and using relatively short expiration terms, the hot list of bad wallets can be kept fairly short. In this manner, the list can be conveniently stored on the wallets themselves, which often have memory capacity limitations. The wallets can perform routine cleanup procedures to remove wallets with expired certificates from the hot list to maintain a short list. The compilation of short hot lists of revoked certificates which can be easily stored on portable electronic devices can be generally extended to other public key cryptosystems besides electronic commerce and asset systems.

Anonymous Electronic Asset System

The anonymous electronic asset system differs from the above described non-anonymous system in two notable ways. First, the certificates issued to the electronic wallets are blindly signed by the certifying authority (or bank, in this example) so that the identity of the wallet is not known to the certifying authority. Second, the coins are blindly signed by the bank so that the identity of the deposited coin, and the payer's wallet are not known to the bank. A "blind signature" is the electric kin of signing an envelop containing a document and a carbon copy. The signature is pressed through the envelop and appears on the document, but the signer has no idea what it is signing. Only the recipient can extract the signed message from the envelop. Blind signatures are described in greater detail in the Schneier book identified at the beginning of Detailed Description Section.

In the non-anonymous system, the bank knew the identity of the user when the user withdrew money. During re-certification, the user is given a new certificate with a new expiration period, but carrying the same old public key. Each valid user has only one certificate at any one time. To move away from a non-anonymous system, the payer's identity must be hidden from the bank. However, even if the bank blindly signed issued coins, the bank would still eventually see the spent assets and identify the certificate via the attached signature. One approach is to employ a combination of blinded signatures and separate keys for withdrawal and payment. In this manner, the bank cannot associate withdrawal with payment. However, there is a possibility that a detectable pattern might emerge based upon use of the payment key pair, which effectively exposes the user's identity.

Accordingly, to ensure true anonymity, the electronic asset system 50 enables the user 54 to break at will any linkability between withdrawal and payment, and between different payments, so that the transactions cannot be traced to the user. Breaking linkability is provided through the issuance of payment certificate(s) and separate withdrawal certificate(s) and the ability for the electronic wallet to change its payment certificate anonymously whenever the user 54 decides. None of the payment certificates are linkable to each other, nor to the withdrawal certificates. In this manner, the user can withdraw coins using one wallet certificate and identification, and then pay with another wallet certificate which can be changed at will.

Figure 5:
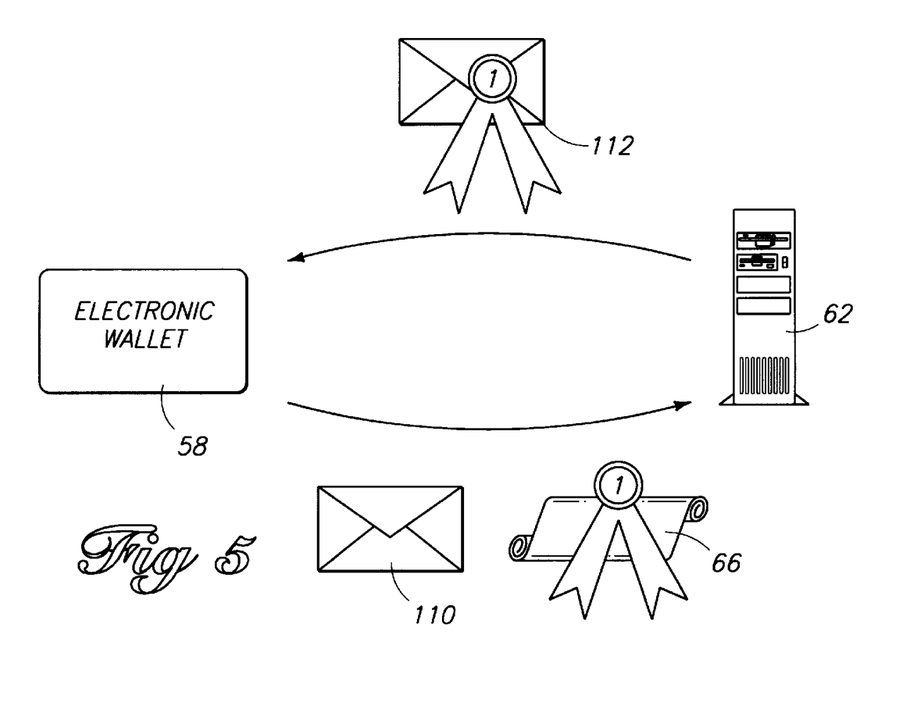
FIG. 5 is a diagrammatic illustration of a certification and withdrawal process in an electronic asset system which is implemented with anonymity.

FIG. 5 shows a blind re-certification process in more detail. For this illustration, suppose that the electronic wallet 58 has already received its initial payment certificate from the bank's computer 62 as described above with reference to FIG. 3. Now, the user desires to change the identity of the electronic wallet by refreshing the payment certificate. The user's electronic wallet 58 connects to the bank's computer 62 and establishes a secure channel using the present pair of keys. The electronic wallet 58 sends its present payment certificate 66, along with a new pair of public and private cryptographic signing keys and a new expiration date enclosed in an "envelop" 110. Suppose M represents the message contents to be sent to the bank, and the electronic wallet 58 has an RSA public key (e, N). Putting M in the "envelop" 110 means creating ($X^e M$ mod N), where x is a secret value known only by the wallet. The new expiration date has a relatively short expiration term (e.g., one month).

The bank's computer 62 evaluates the present payment certificate 66, namely the public signing key contained therein, to ensure that it is valid and not revoked or exhausted. If valid, the bank's computer 62 agrees to blindly sign the envelop 110 by raising the value ($X^e M$ mod N) to the power of d mod N to produce a result ($xM^d$ mod N). The bank's computer then returns the blindly signed payment certificate 112 to the electronic wallet 58. The electronic wallet is the only entity to know the secret x and thus, divides by x to "open the envelop" and obtain the unblinded signature ($M^d$ mod N).

The bank is unable to verify the correctness of the new expiration date. However, this expiration date is eventually revealed to the merchant 56 when the electronic wallet 58 is used. If the expiration date exceeds the appropriate term (say more than one month), the merchant reports the wallet 58 to the fraud detection center 90 which lists the wallet as bad and revokes its public key. Accordingly, the electronic wallet 58 cannot cheat by asking the bank to blindly sign a long or certificate.

The withdrawal certificate(s) can be anonymous or non-anonymous. An anonymous certificate is appropriate when exchanging ordinary cash for electronic cash, or when exchanging old electronic cash for new electronic cash. An anonymous withdrawal certificate is refreshed using the blind approach described above with respect to FIG. 5. A non-anonymous withdrawal certificate is used when depositing assets, and can be refreshed using the non-anonymous approach described above with respect to FIG. 3.

With reference to FIG. 2, the electronic wallet 58 establishes a secure channel 68 with the bank's computer 62 and submits candidate coins and specifies their desired value and expiration dates. The bank assigns the value by choosing a signature exponent corresponding to that value. In the case of withdrawal, the authorized value equals the desired value if the user has sufficient finding in his/her account. The bank's computer blindly signs the coins and return them to the electronic wallet 58. If unused before the expiration date, the unexpired coin is refreshed by submitting it in exchange for a new coin of equal value with a new expiration date.

In the anonymous system, the fraud detection center 90 is still able to detect fraudulently used coins by examining for duplication. From the bad coins, the fraud detection center 90 can determine which wallet spent the coin using the signature attached to the spent coin. This bad wallet can then be added to the list that is broadcast to all wallets and to the merchant 56.

The anonymous system has one potential weakness for attack. A pirate could multispend the same coin and thereafter re-certify the electronic wallet to change its identity before the current wallet is listed as bad and the current signing key is revoked. To prevent this scenario, the anonymous electronic asset system 50 stipulates two rules: (1) every recipient deposits all received coins on a routine basis (e.g., daily), and (2) requests for new certificates are handled anytime before and during the dead time interval, however, new certificates are only issued after the time interval has elapsed.

This second rule is implemented by first defining a dead time interval. The specific time interval can be scheduled during low traffic times, such as at midnight. Before this dead time interval, the bank handles all transactions for the day and allows all batch deposits to clear. Requests for new certificates can likewise come anytime before the dead time interval. During the interval, however, no more deposits or requests are permitted and all new certificate requests are postponed until after the interval is completed. The length of the dead time interval is such that even if all deposits and requests come at the last available second, all processing can terminate during the interval. After the dead time interval, the new certificates are sent and the bank's computer begins processing new deposits and certificate requests. In this manner, the bank's computer is not re-certifying bad wallets until the bank has processed all coins and deterministically detected any bad wallets. This ensures detection of bad wallets before they are re-certified.

The dead time interval is expected to be less than one minute. Suppose that 25 million people in United States use electronic wallets, while banking at one thousand different banks. This averages to twenty-five thousand users per bank. Next, suppose that each user deposits 40 coins per day. At this rate, each bank must verify one million signatures per day. A present-day DSP (digital signal processing) chip can perform approximately 50 thousand 500-bit Rabin verifications per second. So, one DSP chip can verify one million signatures in 20 seconds (1,000,000/50,000=20). This time can be shortened by running multiple DSP chips in parallel.

Another potential scenario concerns a pirate who discovers that the same merchant deposits coins daily at 3:00 PM.

The pirate thus double spends coins beginning at 4:00 PM and later requests a new certification of his wallet before midnight. This process is repeated daily. This scenario would not permit the pirate to profit for long, however, because the fraud detection center 90 would detect the activity and end it before the pirate could break even. While the wallet can change identity, the coins themselves cannot. Accordingly, there is no need to catch a wallet before it changes its identity, just eventually before the pirate can break even with the initial investment of cloning the wallet in the first place.

The certification guidelines for both the anonymous and non-anonymous systems are summarized below:
1. Each electronic wallet is born with a pair of public/private keys, and a corresponding certificate, which are known and listed by a certification authority (CA). This is true both for anonymous and non-anonymous systems.
2. For non-anonymous systems at expiration, each user gets automatically a new certification, which includes the same old public key with a new expiration (unless the user asks to replace the public key for fear that it has been exposed). At each moment, each valid user has exactly one certificate.
3. For anonymous system, at each moment, each valid user has exactly one valid payment certificate and one valid withdrawal certificate. These certificates are distinguishable.

The payment certificate is issued using the blind certificate technique of FIG. 5. A user replaces the initial certificate with an anonymous payment certificate. The initial certificate has a very short expiration, and then periodically, or as needed (but not exceeding an upper bound on expiration) uses the blinded certificate protocol to refresh it. The blinded certificate protocol is done with new fresh public keys.

The withdrawal certificate may be issued anonymously, in which case this is done the same way as with payment certificate. Alternatively, it might be issued non-anonymously, in which case the procedure of (2) is used. The former is used when exchanging ordinary cash for e-cash, or when exchanging old e-cash (that the user received as payee) for fresh e-cash. The later is used when depositing.

In the case of anonymous system, none of the payment certificates are linkable to each other nor to the withdrawal certificates, and the two kinds of withdrawal certificates are not linkable to each other.

It can be statistically shown that for cloning costs of $10,000 per wallet, a sampling rate of one in one hundred transactions will detect forgeries with probability close to one on break-even. The sampling approach is advantageous in that it does not depend on whether fraud is committed in large quantities in a short time period, or in a trickle over a long time period. The sampling rate is a constant factor of the break even cost to the pirate. A sampling rate can always be set to a conservative estimate of the cost required to clone a wallet. These costs vary over time due to technology advances and thus the sampling rates are modifiable to compensate for these cost variations. Additionally, as time goes on, cloning costs are amortized over more wallets, thereby reducing cost per wallet. The sampling rate is increased to maintain constant detection probability, until the rate is too high and new tamper-resistant technology is deployed. Although the average sampling rate depends only on breaking cost of a wallet, it may be needed to react to "bursty" attacks using bursty sampling strategy. Otherwise the adversary may be able to exceed break-even (because detection will happen too late).

The fraud detection and early warning system thus uses a small sampling of the transactions to detect fraud and eliminate it before the criminal can make good on his/her initial cloning investment. The sampling process requires tremendously less resources to operate and maintain in comparison to a full online deterministic fraud detection system. With appropriate sampling parameters, the fraud detection system can sniff out fraudulent activity with high probability (i.e., 95% or better). The banks may decide to currently perform massive evaluation of all coins that are exhausted to absolutely detect fraud. However, this requires substantial storage and processing cost, as well as maintenance expenses. The banks may thus conclude that probabilistic fraud detection is satisfactory and eliminate storage of all exhausted coins.

The above disclosure centered on an electronic asset system. However, it is noted that aspects of this invention can be used generally in a public key cryptography system. In the more general case, electronic devices are assigned certificates with public and private key pairs. The devices then engage in transactions according to a set of prescribed rules which typically involves digital signing using the private signing key.

A sample and detection system samples certain transactions and evaluates whether the transactions comply with the rules. For instance, the detection system might detect which non-transferable items are used twice, or are used following expiration, or violate other detection criteria. Once detected, the detection system uses the digital signature to identify the corresponding certificate of the electronic device. This certificate is then marked as revoked. The detection system generates a list of revoked certificates which are stored locally on the electronic devices. These local lists are then used to prevent further perpetuation of non-compliance with the rules.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

I claim:
1. An electronic asset system comprising:
   a plurality of electronic wallets;
   a plurality of non-transferable electronic assets stored on the electronic wallets, the electronic assets being removed from the wallets when used and marked as exhausted assets; and
   a probabilistic fraud detection system to sample a subset of less than all of the exhausted assets to detect bad assets that have been used in a fraudulent manner, the fraud detection system further identifying the electronic wallets that used the bad assets.
2. An electronic asset system as recited in claim 1 wherein the electronic wallets are tamper-resistant.
3. An electronic asset system as recited in claim 1 wherein the electronic wallets are smart cards programmed to store the electronic assets.
4. An electronic asset system as recited in claim 1 wherein the fraud detection system compiles a list of the identified electronic wallets.
5. An electronic asset system as recited in claim 4 wherein the fraud detection system distributes the list of the identi- fied electronic wallets to warn that the identified electronic wallets have been used in a fraudulent manner.

6. An electronic asset system as recited in claim 4 wherein the list of the identified electronic wallets is stored on the electronic wallets.

7. An electronic asset system as recited in claim 1 wherein the fraud detection system compares a newly exhausted asset to the exhausted assets in the sampled subset to determine whether there is a match, the match being indicative of fraudulent use.

8. An electronic asset system as recited in claim 1 wherein:

the electronic wallets are associated with particular users and are traceable to those users; and the fraud detection system further identifies the users associated with the identified wallets that used the bad assets.

9. An electronic asset system as recited in claim 1 wherein the electronic wallets are issued with temporary certificates that expire on an expiration date.

10. An early detection and warning system for detecting fraudulent transactions involving non-transferable electronic assets, individual electronic assets being transferred from an electronic wallet during a transaction and then exhausted following use in the transaction, the early detection and warning system comprising:

a sample database; and a computer programmed to perform the following steps:
store a sample of less than all of the exhausted electronic assets in the sample database;
evaluate the exhausted electronic assets stored in the sample database;
mark an exhausted electronic asset as a bad electronic asset in an event that the exhausted electronic asset matches another of the exhausted electronic assets stored in the sample database; and
identify an electronic wallet from which the bad electronic asset was transferred as a bad wallet.

11. An early detection and warning system as recited in claim 10 wherein the computer is further programmed to compare a newly exhausted electronic asset with the exhausted electronic assets stored in the sample database to discover a match.

12. An early detection and warning system as recited in claim 10 wherein the computer is further programmed to compile a list of bad wallets.

13. An early detection and warning system as recited in claim 10 further comprising a network connection to an electronic data network, the computer being further programmed to transmit an identity of the bad wallet via the network connection over the electronic data network.

14. An early detection and warning system as recited in claim 10 further comprising a transmitter to broadcast an identity of the bad wallet over a wireless communication network.

15. An electronic fraud detection system for detecting fraudulent transactions involving electronic assets, the electronic fraud detection system comprising:

an asset issuing unit to issue non-transferable electronic assets to asset holders;

a recipient unit to receive the electronic assets that are used by the asset holders; and a fraud sampling unit to evaluate a sampled subset of less than all of the electronic assets received by the recipient unit to detect if the electronic assets have been used in a fraudulent manner, and in an event of detection, the fraud sampling unit identifying the asset holders responsible for fraudulent use of the electronic assets.

16. An electronic fraud detection system as recited in claim 15 wherein the asset holders comprise portable electronic wallets which store the electronic assets.

17. An electronic fraud detection system as recited in claim 15 wherein the asset holders comprise computer memories.

18. An electronic fraud detection system as recited in claim 15 wherein the fraud sampling unit compiles a list of the asset holders that are identified as being responsible for fraudulent use of the electronic assets.

19. An electronic fraud detection system as recited in claim 18 wherein the fraud sampling unit distributes the list of the asset holders to warn that the asset holders have used electronic assets in a fraudulent manner.

20. An electronic fraud detection system as recited in claim 15 wherein the fraud sampling unit compares a newly exhausted electronic asset to the exhausted assets in the sampled subset to determine whether there is a match, the match being indicative of fraudulent use.

21. An electronic fraud detection system as recited in claim 15 wherein:

the asset holders are associated with particular users and are traceable to those users; and the fraud sampling unit identifies the users associated with the asset holders that are identified as responsible for fraudulent use of the electronic assets.

22. An electronic fraud detection system as recited in claim 15 wherein:

the asset holders are configured to expire on an expiration date; and to continue operation after the expiration data, the asset holders are issued a new expiration date by the asset issuing unit.

23. An electronic fraud detection system as recited in claim 22 wherein the asset issuing unit issues the new expiration data for the asset holders during a time period in which the asset issuing unit is not issuing electronic assets.

24. An electronic asset system comprising:

an asset issuing unit to issue non-transferable electronic assets, the electronic assets being digitally signed by the asset issuing unit;

a plurality of asset holders to store the signed electronic assets, each asset holder having an identification certificate containing a cryptographic signing key, the certificate being digitally signed by a certifying authority;

the asset holders being configured to digitally sign the electronic assets when used with their corresponding signing keys;

a recipient unit to receive the electronic assets used by the asset holders, the recipient unit being configured to verify the signatures of the asset holders that used the electronic assets and the asset issuing unit and to accept the electronic assets upon verification of the signatures;

a fraud sampling unit to evaluate a sampled subset of less than all of the electronic assets received by the recipient unit to detect if the electronic assets have been used in a fraudulent manner, and in an event of detection, the fraud sampling unit using the asset holders' signatures on the fraudulently used electronic assets to identify bad asset holders that are responsible for the fraudulent use from among said plurality of asset holders; and the fraud sampling unit being configured to compile a list of the bad asset holders and to provide the list for storage on said plurality of the asset holders to prevent further use of electronic assets stored on the bad asset holders.

25. An electronic asset system as recited in claim 24 wherein the asset holders comprise portable electronic wallets which store the electronic assets.

26. An electronic asset system as recited in claim 24 wherein the asset holders comprise computer memories.

27. An electronic asset system as recited in claim 24 wherein the fraud sampling unit broadcasts the list of the bad assets holders over a data communications network selected from a group comprising a wire-based public network, a cable-based entertainment network, and a wireless communications network.

28. An electronic asset system as recited in claim 24 wherein:
   each certificate issued on an issue date for a selected time period, the certificate being configured to expire on an expiration date following the selected time period after the issue date; and
   the asset holders are updated with new certificates prior to the expiration date of the certificates, each new certificate containing a new cryptographic signing key and being digitally signed by the certifying authority.

29. An electronic asset system as recited in claim 24 wherein the asset issuing unit blindly signs the electronic assets to render them non-traceable.

30. An electronic asset system as recited in claim 24 wherein the asset issuing unit is the certifying authority that digitally signs the certificates for the asset holders.

31. A system comprising:
   a plurality of electronic devices having corresponding certificates issued thereto, the certificates including a pair of public and private signing keys;
   individual electronic devices being configured to perform one or more transactions which involve digitally signing data using the private signing key;
   a sample and detection system to sample a subset of less than all transactions to determine whether the electronic devices are complying with a preset criteria, and in the event of non-compliance, the sample and detection system using the digitally signed data involved in the transactions to identify the non-complying electronic devices; and
   the sample and detection system generating a list of certificates which correspond to the non-complying electronic devices and are to be revoked to prevent the non-complying electronic devices from entering into further transactions.

32. A revocation system as recited in claim 31 wherein the list is stored locally on the electronic devices.

33. A method for detecting fraudulent transactions involving electronic assets, the method comprising the following steps:
   issuing non-transferable electronic assets;
   storing the electronic assets in electronic wallets;
   spending at least some of the electronic assets contained on the electronic wallets by transferring the electronic assets from the electronic wallets to at least one recipient;
   extracting a sample of less than all of the spent electronic assets;
   detecting from the sample of spent electronic assets whether there is one or more bad electronic assets that have been spent in a fraudulent manner; and
   upon detecting a bad electronic asset, identifying an electronic wallet from which the bad electronic asset was spent.

34. A method as recited in claim 33 further comprising the following steps:
   digitally signing the electronic assets with a first signature during said issuing step;
   digitally signing the electronic assets with a signature of the corresponding electronic wallet during said spending step; and
   evaluating, at the recipient, both signatures before receiving the electronic assets.

35. A method as recited in claim 33 wherein the detecting step comprises the following steps:
   comparing a newly spent electronic asset to the sample of spent electronic assets; and
   marking the newly spent electronic asset as a bad electronic asset upon a match of the newly spent electronic asset and one of the spent electronic assets in the sample.

36. A method as recited in claim 33 further comprising the following steps:
   assigning certificates to corresponding ones of the electronic wallets, the certificates having an expiration date whereupon expiration, the electronic wallets are prohibited from spending the electronic assets stored thereon; and
   updating the certificates before the expiration date.

37. A method as recited in claim 36 further comprising the additional step of ceasing to issue electronic assets or certificates during a time period in which the certificates are updated.

38. A computer-implemented method for detecting fraudulent transactions involving non-transferable electronic assets used by electronic wallets, the electronic assets being considered as exhausted electronic assets upon use, the computer-implemented method comprising the following steps:
   extracting a sample of less than all of the exhausted electronic assets;
   evaluating the sample of exhausted electronic assets;
   marking an exhausted electronic asset as a bad electronic asset when the exhausted electronic asset matches another of the exhausted electronic assets in the sample;
   identifying an electronic wallet from which the bad electronic asset was spent as a bad electronic wallet; and
   compiling a list of bad electronic wallets.

39. A computer-implemented method as recited in claim 38 further comprising comparing a newly exhausted electronic asset to the exhausted electronic assets to detect a match.

40. A computer-implemented method as recited in claim 38 further comprising storing the list of bad electronic wallets on the electronic wallets.

41. A computer-implemented method as recited in claim 38, wherein the electronic wallets have associated certificates, the method further comprising broadcasting a list of certificates for the bad electronic wallets.

42. A computer-readable memory storing a program which directs a computer to perform the steps of the method as recited in claim 38.

43. A computer programmed to perform the steps of the method as recited in claim 38.

44. A computer-readable data structure for holding the list of bad electronic wallets that is generated by the steps of the method as recited in claim 38.

* * * * *